United States Patent
Fume (10) Patent No.: US 12,547,830 B2
(45) Date of Patent: Feb. 10, 2026

(54) DOCUMENT CLASSIFICATION APPARATUS, METHOD, AND STORAGE MEDIUM

(71) Applicant: KABUSHIKI KAISHA TOSHIBA, Tokyo (JP)

(72) Inventor: Kosei Fume, Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 252 days.

(21) Appl. No.: 18/170,070

(22) Filed: Feb. 16, 2023

(65) Prior Publication Data

US 2024/0086635 A1    Mar. 14, 2024

(30) Foreign Application Priority Data

Sep. 14, 2022    (JP) ................................ 2022-146387

(51) Int. Cl.
*G06F 40/279*    (2020.01)
*G06F 16/93*    (2019.01)
(Continued)

(52) U.S. Cl.
CPC ............ *G06F 40/279* (2020.01); *G06F 16/93* (2019.01); *G06F 40/216* (2020.01); *G06N 5/022* (2013.01)

(58) Field of Classification Search
CPC ...... G06F 40/279; G06F 16/93; G06F 40/216; G06F 40/30; G06F 40/284; G06N 5/022
See application file for complete search history.

(56) References Cited

U.S. PATENT DOCUMENTS

2007/0136288 A1*  6/2007  Shimada ................. G06F 16/10
                                                          707/E17.084
2019/0370323 A1* 12/2019  Davidson ................ G10L 15/26
(Continued)

FOREIGN PATENT DOCUMENTS

JP    2018194881 A    12/2018
WO    2021044460 A1    3/2021

OTHER PUBLICATIONS

Biswas, et al., "TransICD: Transformer Based Code-wise Attention Model for Explainable ICD Coding", Mar. 28, 2021.
(Continued)

*Primary Examiner* — Darioush Agahi
(74) *Attorney, Agent, or Firm* — Holtz, Holtz & Volek PC (57) ABSTRACT

According to one embodiment, a document classification apparatus includes a processing circuit. The processing circuit is configured to: acquire text content for each of logical elements for semi-structured document data including text data stored for each of the logical elements; select logical elements from the logical elements and generating logical element sets each including the logical elements; analyze text contents for the respective logical element sets and constructing respective word embedded spaces; select a first word embedded space and a second word embedded space including a common word shared with the first word embedded space from the word embedded spaces, and update the first word embedded space based on similarity to the common word in the second word embedded space; and output a classification result of the document data using the first word embedded space and embedding information of a feature quantity of a classification target.

10 Claims, 9 Drawing Sheets

(51) Int. Cl.
    *G06F 40/216*    (2020.01)
    *G06N 5/022*     (2023.01)

(56) References Cited

U.S. PATENT DOCUMENTS

| | | | | |
|---|---|---|---|---|
| 2021/0383871 | A1* | 12/2021 | Berman | G11C 16/26 |
| 2021/0406452 | A1* | 12/2021 | Hasan | G06N 3/08 |
| 2022/0107972 | A1 | 4/2022 | Fume | |
| 2022/0180068 | A1* | 6/2022 | Sahayaraj | G06F 40/166 |
| 2023/0027526 | A1* | 1/2023 | Kim | G06N 3/088 |
| 2024/0036527 | A1* | 2/2024 | Seo | G05B 13/0205 |

OTHER PUBLICATIONS

Japanese Office Action (and an English language translation thereof) dated Dec. 9, 2025, issued in counterpart Japanese Application No. 2022-146387.

* cited by examiner

| Patient ID | Disease name 1 | Disease name 2 | Disease name 3 | Dissection view | Surgery view | Additional remarks | Note | Place and situation of damage |
|---|---|---|---|---|---|---|---|---|
| 00000001 | Acute circulatory failure | Sick sinus syndrome | Acute heart failure | ... | ... | Cardiopulmonary arrest after falling down | Transported to this hospital due to cardiopulmonary arrest, heartbeat was not restored notwithstanding cardiopulmonary resuscitation | ... |
| 00000002 | Hemorrhagic shock | Pelvic fracture | | ... | ... | By traffic accident | | |
| ... | | | | | | | | ... |
| 00001024 | Noncommunicating hydrocephalus | Giant cerebral base aneurysm | | | | ... | | |

| F07.0 | Organic personality disorder |
| --- | --- |
| FD7.1 | Postencephalitic syndrome |
| F07.2 | Postconcussional syndrome |
| F07.8 | Other organic personality and behavioral disorders due to brain disease, damage, and dysfunction |
| F07.9 | Unspecified organic personality and behavioral disorder due to brain disease, damage, and dysfunction |

FIG. 10

| | |
|---|---|
| G46.0 | Middle cerebral artery syndrome |
| G46.1 | Anterior cerebral artery syndrome |
| G45.2 | Posterior cerebral artery syndrome |
| G45.3 | Brain stem stroke syndrome |
| G45.4 | Cerebellar stroke syndrome |
| G46.5 | Pure motor multiple micro-infarction (lacunar) syndrome |
| G46.6 | Pure sensory multiple micro-infarction (lacunar) syndrome |
| G46.7 | Other multiple micro-infarction (lacunar) syndromes |
| G46.8 | Other vascular syndromes of brain in cerebrovascular diseases |

FIG. 11

| | |
|---|---|
| I68.0 | Cerebral amyloid angiopathy |
| I68.1 | Cerebral arteritis in infectious and parasitic diseases classified elsewhere |
| I68.2 | Cerebral arteritis in other diseases classified elsewhere |
| I68.8 | Other cerebrovascular disorders in diseases classified elsewhere |

DOCUMENT CLASSIFICATION APPARATUS, METHOD, AND STORAGE MEDIUM

CROSS-REFERENCE TO RELATED APPLICATION

This application is based upon and claims the benefit of priority from prior Japanese Patent Application No. 2022-146387, filed Sep. 14, 2022, the entire contents of which are incorporated herein by reference.

FIELD

Embodiments described herein relate generally to a document classification apparatus, a method, and a storage medium.

BACKGROUND

Specific codes are assigned to document data in reports in business and/or questionnaires serving as bases of national statistical information. Assigning specific codes enables easy classification of document data by mechanical processing to use the document data for analysis and/or search. For example, in reports of death serving as basic information of vital statistics, ICD codes being international classifications of WHO are assigned on the basis of disease names and/or underlying causes of death written in the death questionnaires.

However, in the case where reports of death cannot be automatically processed on the basis of predetermined rules or in the case of where supplementary information by free description is included in reports of death, it is required to check reports of death by manpower, and much business cost and labor may be required. For example, automatic processing is difficult in the case of identifying the underlying cause of death on the basis of the contents of the free description written in the field of additional remarks. In addition, disease names are not always written as defined in the ICD codes, and orthographical variants may exist in the disease names.

As described above, in conventional art, in means for analyzing input documents used in automatic document classification applications and the like for semi-structured document data, such as reports and questionnaires, structural information relating to logical elements, such as items, cannot be positively handled in construction of word embedding, and classification performance in document classification decreases. In addition, in the case of dealing with structural information as exceptional handling, this structure has the problem that excessive cost is required because check by manpower is required.

DETAILED DESCRIPTION

In general, according to one embodiment, a document classification apparatus includes a processing circuit. The processing circuit is configured to: acquiring text content for each of logical elements for semi-structured document data including text data stored for each of the logical elements; selecting logical elements from the logical elements and generating a plurality of logical element sets each including one or more of the logical elements; analyzing text contents for the respective logical element sets and constructing respective word embedded spaces; selecting a first word embedded space and a second word embedded space including a common word shared with the first word embedded space from the word embedded spaces, and updating the first word embedded space based on similarity to the common word in the second word embedded space; and outputting a classification result of the document data using the first word embedded space and embedding information of a feature quantity of a classification target.

An embodiment of a document classification apparatus, a method, and a program will be explained in detail with reference to drawings. In the following explanation, constituent elements having substantially the same functions and structures are denoted by the same reference numeral, and an overlapping explanation will be made only when necessary.

Embodiment

Figure 1:
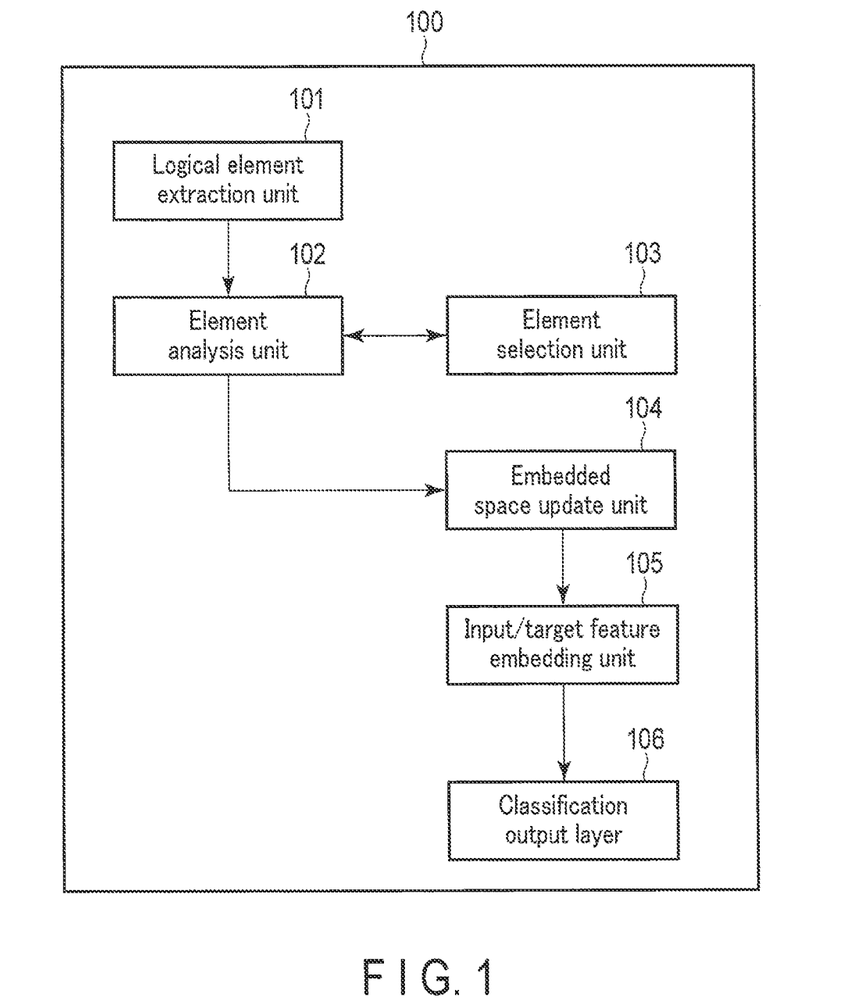
FIG. 1 is a diagram illustrating an example of a configuration of a document classification apparatus according to an embodiment.

FIG. 1 is a diagram illustrating a configuration of a document classification apparatus 100 according to an embodiment. The document classification apparatus 100 is an apparatus receiving input of semi-structured document data (hereinafter simply referred to as "document"), such as reports and questionnaires, and analyzing and classifying the input documents (hereinafter referred to as "input documents").

As input documents, semi-structured documents including text data stored for each of a plurality of logical elements can be used. Examples of the semi-structured documents include documents in table form and documents in chapter form. If the input documents are documents in table form, items of the table correspond to logical elements. Examples of the documents in table form include reports of death and/or diagnostic reports in vital statistics. In this case, the document classification apparatus 100 estimates International Classification of Disease (ICD) codes from words and/or texts included in the reports of death and/or diagnostic reports, and outputs them. In the case where the input documents are documents in chapter form, items of the respective chapters correspond to logical elements. Examples of the documents in chapter form include patent documents. In this case, the document classification apparatus 100 estimates the ICD codes from texts included in the patent documents, and outputs them. The documents are not limited to reports of death and patent documents, but any documents in form for which items and contents described in the texts are conveniently determined can be used as semi-structured documents. For example, many types of documents can be used as the semi-structured documents, such as business documents in general chapter form and item form and questionnaire documents including both items including class values and free description.

The document classification apparatus 100 is connected to a server and/or a system managing document data via a network or the like. The network is, for example, a LAN (Local Area Network). Connection to the network may be wired connection or wireless connection. The network is not limited to a LAN, but may be the Internet or a public communication line.

The document classification apparatus 100 includes a processing circuit managing the whole document classification apparatus 100, and a storage medium (memory). The processing circuit is a processor executing functions of a logical element extraction unit 101, an element analysis unit 102, an element selection unit 103, an embedded space update unit 104, an input/target feature embedding unit 105, and a classification output unit 106, by invoking and executing a program in the storage medium. The processing circuit is formed of an integrated circuit including a CPU (Central Processing Unit), an ASIC (Application Specific Integrated Circuit), or a FPGA (Field Programmable Gate Array) or the like. The processor may be formed of one integrated circuit or a plurality of integrated circuits.

The storage medium stores a processing program used with the processor and parameters and tables and the like used for arithmetic operation in the processor. The storage medium is a storage device, such as a HDD (Hard Disk Drive), a SSD (Solid State Drive), and an integrated circuit storing various types of information. The storage device may be a portable storage medium, such as a CD (Compact Disc), a DVD (Digital Versatile Disc), and a flash memory, as well as a HDD and a SSD, or a driving device reading and writing various types of information from and to a semiconductor memory device, such as a flash memory and a RAM (Random Access Memory).

A single processing circuit may achieve the functions of the logical element extraction unit 101, the element analysis unit 102, the element selection unit 103, the embedded space update unit 104, the input/target feature embedding unit 105, and the classification output unit 106, or a processing circuit may be formed of a combination of a plurality of independent processors and the functions of the units may be achieved by execution of programs with the processors. The functions of the logical element extraction unit 101, the element analysis unit 102, the element selection unit 103, the embedded space update unit 104, the input/target feature embedding unit 105, and the classification output unit 106 may be implemented as individual hardware circuits.

The logical element extraction unit 101 acquires text content for each of logical elements for semi-structured document data. In other words, the logical element extraction unit 101 distinguishes logical elements included in the document data, and acquires text content for each of the logical elements.

The element analysis unit 102 constructs word embedding for the text acquired for each logical element. In this operation, the element analysis unit 102 analyzes text content for each of a plurality of logical element sets generated with the element selection unit 103 described later, and constructs a word embedded space. The word embedded space has multidimensional vector information set for each word forming the word embedded space. A unit such as a word, a compound word, and a subword can be used as the word of the word embedded space.

The element section unit 103 generates a plurality of logical element sets each including one or more logical elements by selecting logical elements from a plurality of logical elements. The logical element sets may be referred to as "subsets". Each of logical element sets may be formed of only one logical element in all the logical elements included in the document, include all the logical elements included in the document, and include logical elements of a specific combination.

The embedded space update unit 104 selects a first word embedded space serving as an update target and a second word embedded space including a word (hereinafter referred to as "common word") shared with the first word embedded space from a plurality of word embedded spaces, and updates the first word embedded space on the basis of similarity to the common word in the second word embedded space. In other words, the embedded space update unit 104 extracts a common word appearing in common in different word embedded spaces in words included in the word embedded spaces, and updates the word embedded space on the basis of similarity to the common word.

A word embedded space mainly used for document classification is selected as the first word embedded space. For example, a word embedded space constructed using a logical element set including all the logical elements forming the document is selected as the first word embedded space. The first word embedded space may be referred to as "global space".

A word embedded space used for correction for the first word embedded space in embedded space update processing described later is selected as the second word embedded space. For example, a word embedded space including a common word with the words forming the first word embedded space is selected as the second word embedded space. The common word is a word appearing both in the words forming the first word embedded space and the words forming the second word embedded space. For example, a word embedded space formed of logical elements that are important in document classification is selected as the second word embedded space. The second word embedded space may be referred to as "local space".

The word embedded spaces selected as the first word embedded space and the second word embedded space may be set in advance in accordance with the type and/or characteristics of the documents serving as the classification targets, or may be designated by the user.

When the first word embedded space is updated, the embedded space update unit 104 updates the first word embedded space by, for example, causing the first word embedded space to learn a sentence including a common word in sentences included in learning data. In this operation, the embedded space update unit 104 extracts a similar word for the common word from the second word embedded space, uses a sentence including the similar word as a positive example, and uses a sentence including no similar word as a negative example. The similar word is a word similar to the common word on the word embedded space. The similar word is acquired by, for example, calculating cosine similarity between each word and the common word on the basis of vector information of each word defined in each word embedded space, and extracting a word having calculating cosine similarity higher than a predetermined value.

The embedded space update unit 104 may execute learning for the first word embedded space by extracting a similar word for the common word from the second word embedded space and adjusting weighting of the first word embedded space in accordance with the appearance rate of the similar word.

The input/target feature embedding unit 105 includes the updated first word embedded space and embedding information of a feature quantity of the classification target. The embedding information of the feature quantity of the classification target is, for example, embedding information including a feature quantity of each classification class used as a classification result.

The classification output unit 106 outputs a class classification result serving as an object. Specifically, the classification output unit 106 outputs a classification result of the input document using the first word embedded space updated with the embedded space update unit 104 and embedding information of the feature quantity of the classification target.

For example, the classification output unit 106 includes a convolutional layer, a pooling layer (for example, a max-over-time pooling layer), and an output layer. The convolutional layer executes convolution processing for each word using a plurality of filters to generate a new feature quantity. The pooling layer executes pooling processing for the feature quantity generated with each of filters, and outputs a multidimensional feature quantity. The output layer outputs a result acquired by multiplying the output from the pooling layer by a softmax function as a classification result.

An ordinary machine learning model used for document classification, such as CNN (Convolutional Neural Network) and RNN (Recurrent Neural Network), can be used for the input/target feature embedding unit 105 and the classification output unit 106.

Figure 2:
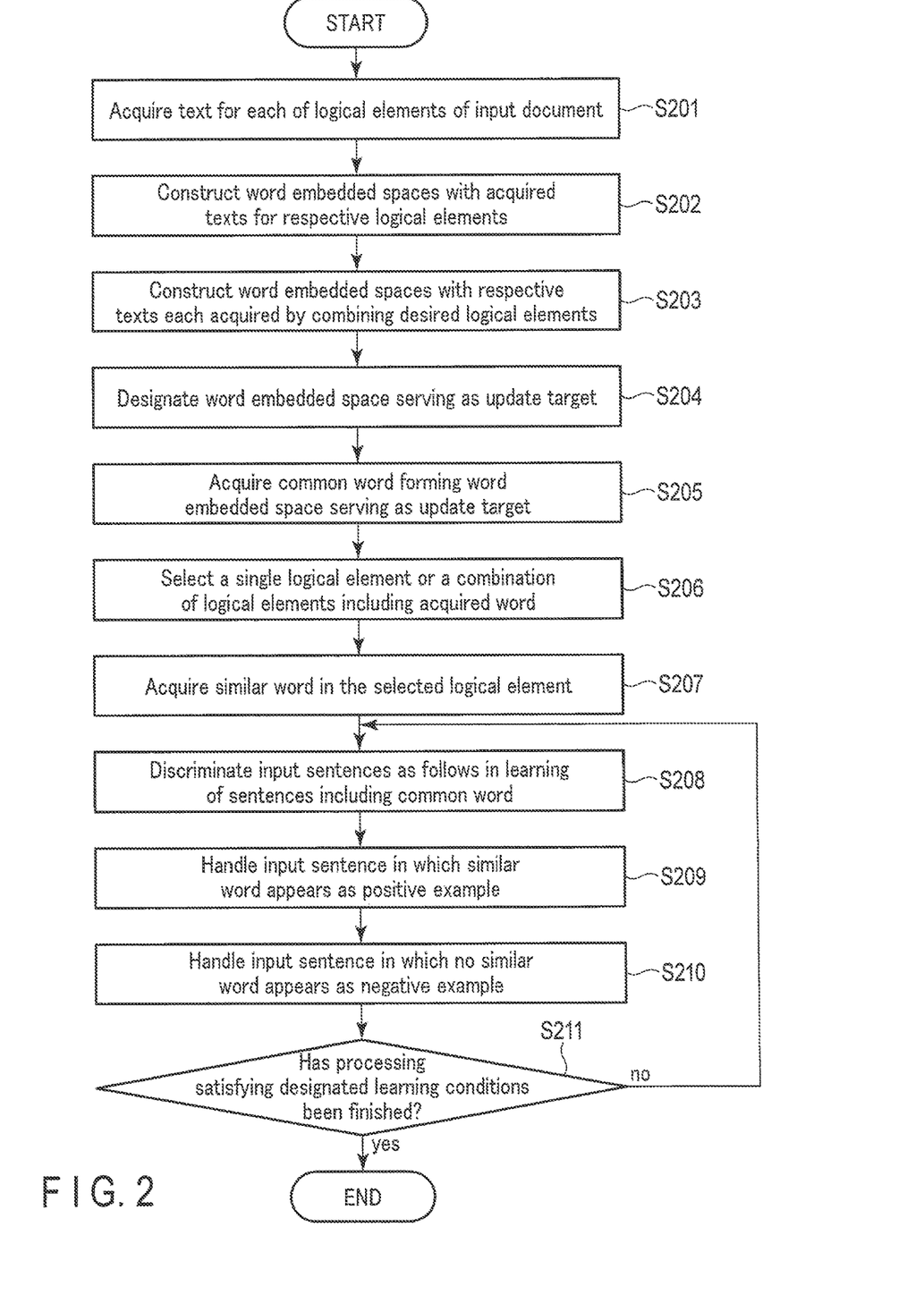
FIG. 2 is a flowchart illustrating a processing procedure of embedded space update processing executed with the document classification apparatus according to the embodiment.

The following is an explanation of operation of embedded space update processing executed with the document classification apparatus 100. FIG. 2 is a flowchart illustrating an example of a procedure of embedded space update processing. The embedded space update processing is processing of updating the word embedded space used for classification of semi-structured documents, in consideration of the word embedded space for each of logical elements. This example illustrates the case of updating the word embedded space to provide classification of the ICD code to a report of death. The processing procedure in each processing explained hereinafter is a mere example, and each processing can be properly changed as long as possible. In the processing procedure explained hereinafter, steps can properly be omitted, replaced, and added in accordance with the form of implementation.

(Embedded Space Update Processing)
(Step S201)

First, the logical element extraction unit 101 acquires text for each of logical elements for document data (hereinafter referred to as "input document") used for learning. In this operation, the logical element extraction unit 101 executes natural language analysis for a number of reports of death used as learning data, and acquires text data described in the reports of death for each of items of the reports of death.

Figure 3:
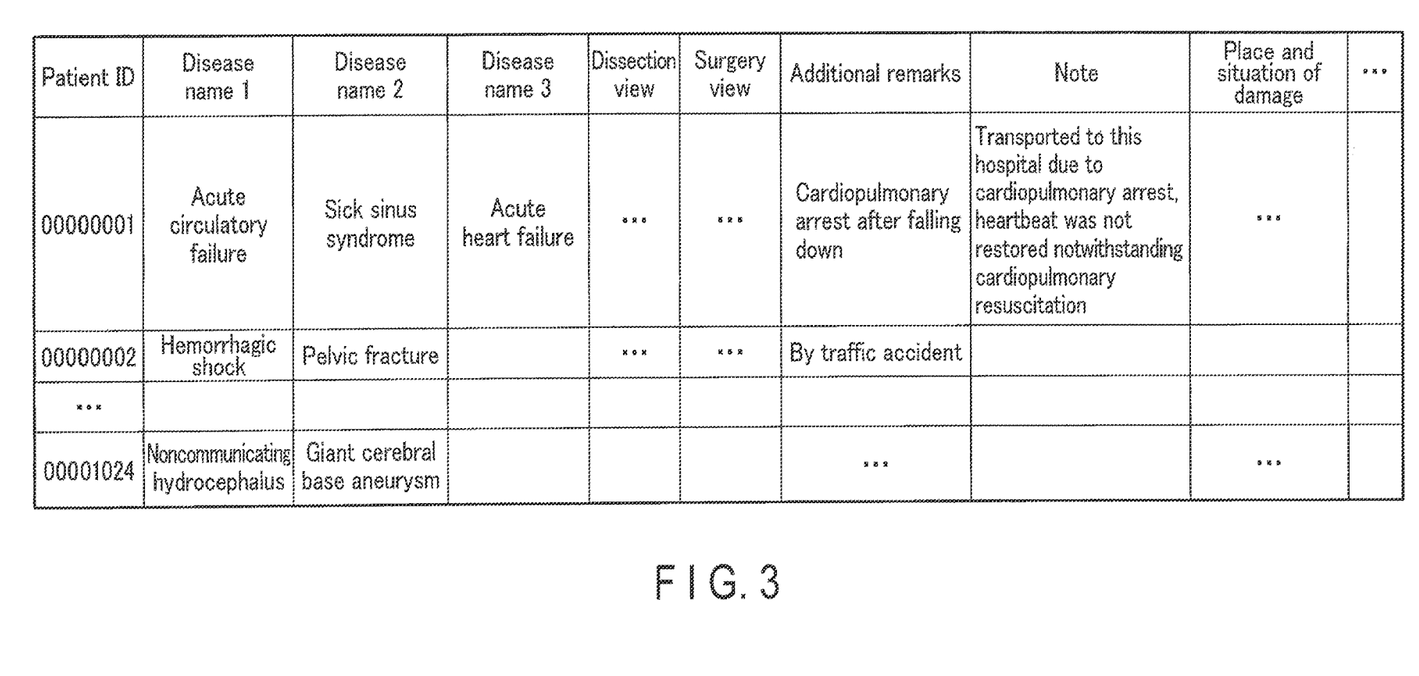
FIG. 3 is a diagram illustrating an example of a report of death used as learning data.

FIG. 3 is a diagram illustrating an example of document data used as learning data. The learning data illustrated in FIG. 3 is an example of data in table form in which texts written in a report of death for a plurality of people are stored in respective items. A report of death generally describe a patient ID identifying the patient, one or more disease names, dissection view, surgery view, additional remarks, note, place of damage, situation of damage, and the like. In this case, the patient ID is written as a numerical number, and the disease names are mainly written with words and compound words. The item "additional remarks" and the item "note" are written with free description sentences. In the report of death, items such as "patient ID", "disease name", "dissection view", "surgery view", "additional remarks", "note", "place of damage", "situation of damage" and the like correspond to logical elements, and the free description written in each of the items corresponds to text data stored for each of the logical elements.

In the case of using patent documents as semi-structured document data, items such as "Title of Invention", "Background Art", "Summary of Invention", "Embodiment of Invention", and "Abstract" and the like correspond to logical elements, and the free description written in each of the items corresponds to text data stored for each of the logical elements.

(Step S202)

Next, the element analysis unit 102 constructs a word embedded space using the text acquired for each of the logical elements. In this operation, the element analysis unit 102 constructs a word embedded space for each of the items of the report of death. For example, a word embedded space is constructed for each of the items "Disease Name 1", "Disease name 2", "Dissection View", and "Additional Remarks" and the like illustrated in FIG. 3.

(Step S203)

Thereafter, the element selection unit 103 generates a plurality of logical element sets by selecting desired logical elements. Thereafter, the element analysis unit 102 analyzes the text for each of the logical element sets each acquired by combining desired logical elements, and constructs a word embedded space. For example, if the input document is the report of death illustrated in FIG. 3, generated logical elements include a logical element set including texts written in the items "Disease Name 1", "Disease Name 2", and "Disease Name 3", and a logical element set including texts written in the items "Disease Name 1" and "Additional Remarks". As another example, a logical element set including all the texts written for a specific patient may be generated using the specific patient ID as an item.

(Step S204)

Thereafter, the embedded space update unit 104 designates a first word embedded space serving as an update target. In this operation, the embedded space update unit 104 selects a word embedded space used for document classification as the update target. The selected word embedded space may be a space constructed for each single item at Step S202, or constructed by combining a plurality of items at Step S203.

Figure 4:
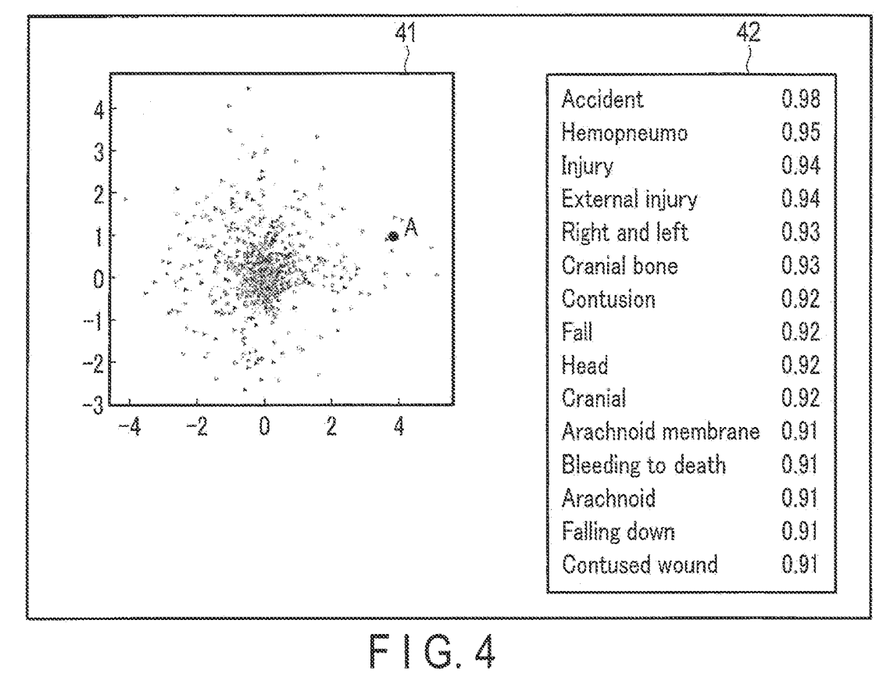
FIG. 4 is a diagram illustrating a word embedded space constructed using texts of an item "Disease Name 1" in FIG. 3.
Figure 5:
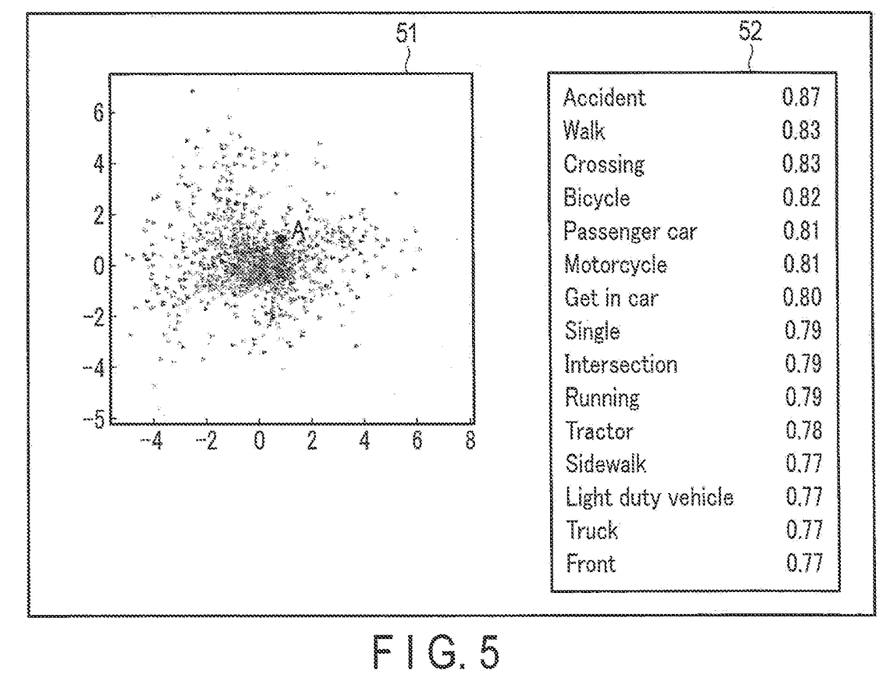
FIG. 5 is a diagram illustrating a word embedded space constructed using texts of an item "Additional Remarks" in FIG. 3.
Figure 6:
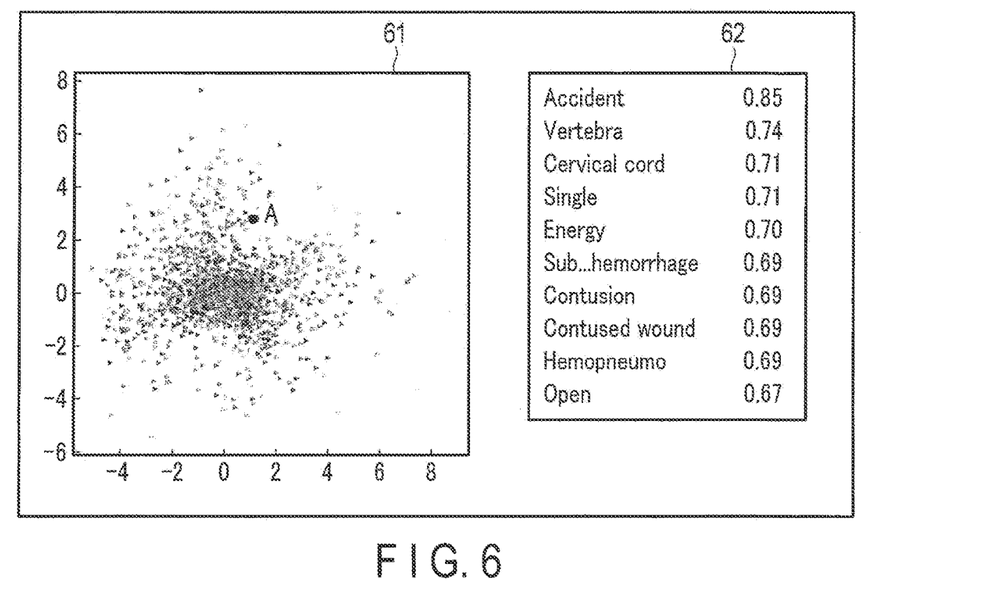
FIG. 6 is a diagram illustrating a word embedded space constructed using texts of the items "Disease Name 1" and "Additional Remarks" in FIG. 3.

This explanation illustrates the case of designating the word embedded space constructed using the two items "Disease Name 1" and "Additional Remarks" in the items included in the report of death illustrated in FIG. 3 as the first embedded space, as an example. FIG. 4 is a diagram illustrating a word embedded space 41 constructed using the texts of the item "Disease Name 1". FIG. 5 is a diagram illustrating a word embedded space 51 constructed using the texts of the item "Additional Remarks". FIG. 6 is a diagram illustrating a word embedded space 61 constructed using the texts of the items "Disease Name 1" and "Additional Remarks".

(Step S205)

Thereafter, the embedded space update unit 104 acquires a word forming the first word embedded space serving as the update target. In this operation, the embedded space update unit 104 acquires a word forming the word embedded space 61 constructed using the two items "Disease Name 1" and "Additional Remarks".

(Step S206)

Thereafter, the embedded space update unit 104 selects one or more logical element sets including a common word with the word acquired at Step S205 as the logical element set used for correction. This explanation illustrates the case where the logical element set formed of the item "Disease Name 1" is selected as the logical element used for correction, as an example. The word embedded space 41 constructed using the texts of the item "Disease Name 1" includes a common word "traffic" as a word common with the words forming the word embedded space 61. In addition, when a logical element set used for correction is selected, a logical element set formed of one logical element may be selected, or a logical element set including a combination of a plurality of logical elements satisfying the condition.

(Step S207)

Thereafter, the embedded space update unit 104 acquires a similar word for the common word in the logical element set selected at Step S206. In this operation, the embedded space update unit 104 selects a word embedded space constructed using the logical element set used for correction as a second word embedded space. Thereafter, the embedded space update unit 104 acquires a word having a distance (for example, cosine distance) from the common word in the second word embedded space as a similar word. As the similar word, all the words having a distance from the common word falling within a predetermined value may be extracted, or a predetermined number of words may be extracted in ascending order of distance from the common word.

A list 42 in FIG. 4 is a list of similar words for the word "traffic" extracted from the word embedded space 41 and arranged in descending order of similarity. The list 42 illustrates scores normalized such that a word most similar to the word "traffic" has a value of 1.0 and a word least similar to the word "traffic" has a value of 0.0. When the list 42 is viewed, the list 42 shows that, in the item "Disease Name 1", for example, the word "traffic" in Japanese is used in contexts related to names of arteries and cerebral blood vessels, such as "arachnoid membrane" and "arachnoid".

(Step S208)

Thereafter, the embedded space update unit 104 updates the first word embedded space serving as the update target. In this operation, the embedded space update unit 104 updates the first word embedded space serving as the update target by causing the first word embedded space serving as the update target to learn using sentences including the common word in the sentences included in the input document. In this operation, the word embedded space 61 is updated by input of sentences including the common word "traffic" in the sentences included in the input document to the word embedded space 61.

(Step S209)

When each of sentences is learned by the first word embedded space, the embedded space update unit 104 uses the input sentence in which the similar word acquired at Step S207 appears, as a positive example. In the first word embedded space, a word vector of the word included in the sentence input as a positive example is updated such that its distance from the common word is reduced.

For example, in the sentences included in the item "Disease Name 1", if a sentence including the word "contusion" serving as a similar word for the common word "traffic" is input to the word embedded space 61, the sentence is learned as a positive example. As a result, in the word embedded space 61, the word vector of the word included in the sentence is adjusted such that its distance from the word "traffic" is reduced.

(Step S210)

When each of the sentences is learned by the first word embedded space serving as the update target, the embedded space update unit 104 uses the input sentence in which no similar word acquired at Step S207 appears as a negative example. In the word embedded space 61, the word vector of the word included in the sentence input as a negative example is updated such that its distance from the word "traffic" is increased.

For example, in the sentences included in the item "Additional Remarks", if a sentence including no similar word in the list 42 of FIG. 4 is input to the word embedded space 61, the sentence is learned as a negative example. As a result, in the word embedded space 61, the word vector of the word included in the sentence is adjusted such that its distance from the word "traffic" is increased.

(Step S211)

The embedded space update unit 104 repeatedly executes the processing from Step S208 to Step S210 until the processing satisfying the designated learning conditions is finished. For example, the embedded space update unit 104 continues learning and updates the word embedded space 61, by repeating the processing described above until the processing is stopped by constraints, such as the upper limit of the number of epochs and the improvement width of the temporary accuracy with development data. If learning is executed until the designated learning conditions are satisfied, a series of processes in the embedded space update processing are finished.

A list 52 in FIG. 5 is a list of similar words for the word "traffic" extracted from the word embedded space 51 and arranged in descending order of similarity. The list 52 illustrates scores normalized such that a word most similar to the word "traffic" has a value of 1.0 and a word least similar to the word "traffic" has a value of 0.0. When the list 52 is viewed, the list 52 shows that, in the item "Additional Remarks", the word "traffic" is used in contexts related to traffic accidents, such as "traffic accident" and "traffic injury". In addition, when the list 42 is viewed, the list 42 shows that, in the item "Disease Name 1", the word "traffic" is used in contexts related to names of arteries and cerebral blood vessels, such as "arachnoid membrane" and "arachnoid".

A list 62 in FIG. 6 is a list of similar words for the word "traffic" extracted from the word embedded space 61 and arranged in descending order of similarity. The list 62 illustrates scores before update of the word embedded space 61 serving as the update target. When the word embedded space 61 and the list 62 are viewed, they show that the similarity scores generally decrease due to increase in text quantity serving as the parameter in comparison with the case of constructing the space from the single item like the word embedded spaces 41 and 51 and the lists 42 and 52, and words that are difficult to understand intuitively appear, such as words "energy" and "single".

Figure 7:
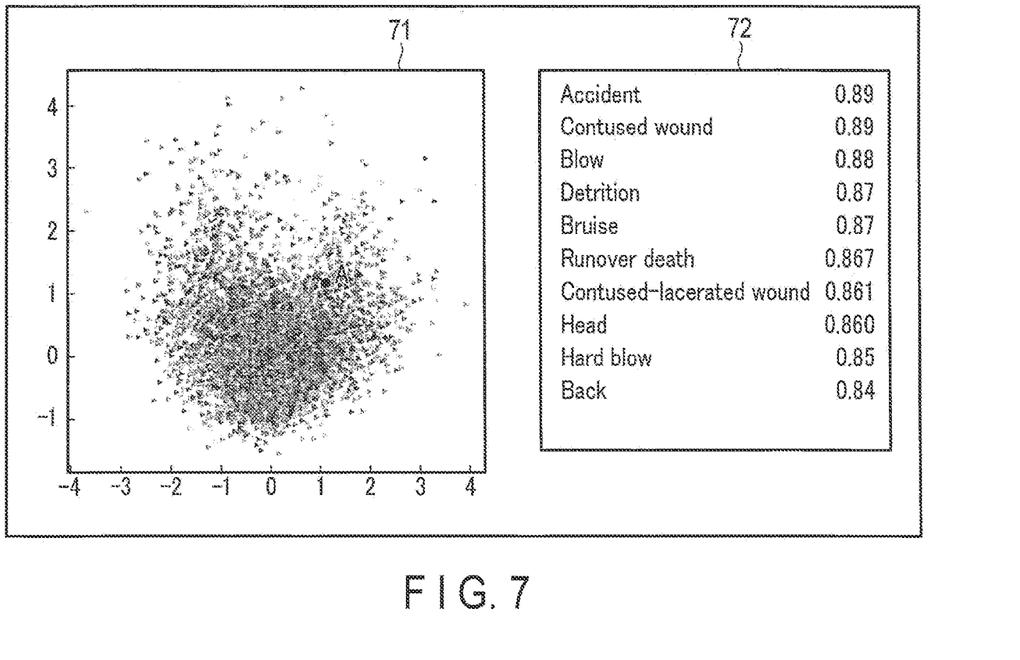
FIG. 7 is a diagram illustrating a word embedded space after the word embedded space in FIG. 6 is updated.

FIG. 7 is a diagram illustrating a word embedded space 71 after update of the word embedded space 61. In addition, a list 72 in FIG. 7 is a list of similar words for the word "traffic" extracted from the word embedded space 71 and arranged in descending order of similarity. In the list 72, characteristic words such as "contusion" and "runover death" that do not appear in any of the word embedded spaces 41, 51, and 61 are acquired as similar words. In addition, the list 72 also shows that the words such as "head" related to the brain are maintained.

As described above, even if the common word "traffic" appears in a plurality of items ("Disease Name 1" and "Additional Remarks") forming the word embedded space 61 used for document classification and the word "traffic" is used in different contexts in the respective items, the word embedded space 41 constructed with the item "Disease Name 1" is designated as an item important for classification to execute the embedded space update processing. In this manner, weighting of each of words forming the word embedded space 61 is adjusted such that the words used in the item "Disease Name 1" are handled as similar words for the word "traffic" with priority over the words used in the other items (for example, "Additional Remarks"). This structure enables construction of a word embedded space 71 in which the word "traffic" is embedded with the proper context, because priority is given to characteristic words of the item "Disease Name 1" designated as the important item, as similar words for the word "traffic".

Figure 8:
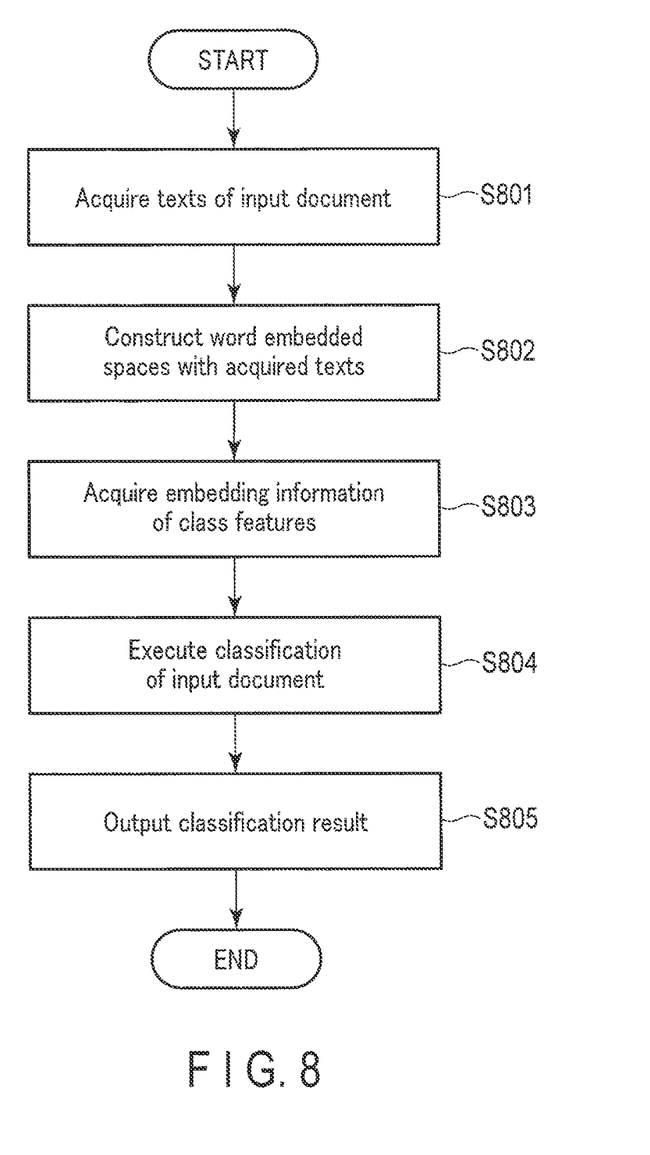
FIG. 8 is a flowchart illustrating a processing procedure of document classification processing executed with the document classification apparatus according to the embodiment.

The following is operations of document classification processing executed with the document classification apparatus 100. FIG. 8 is a flowchart illustrating an example of the procedure of document classification processing. The document classification processing is processing of providing classification to the semi-structured input document using the updated word embedded space 71. This explanation illustrates the case of providing classification of the ICD code to the input report of death, as an example. The processing procedure in each processing explained hereinafter is a mere example, and each processing can be properly changed as long as possible. In the processing procedure explained hereinafter, steps can properly be omitted, replaced, and added in accordance with the form of implementation.

(Document Classification Processing)
(Step S801)
First, the logical element extraction unit 101 acquires text for each of logical elements of the input document to be classified. For example, the logical element extraction unit 101 executes natural language analysis for the input report of death, and acquires text data written in the report of death.
(Step S802)
Thereafter, the element analysis unit 102 sets a word vector as word embedding expression for each of acquired words using the text acquired at Step S801 and the updated word embedded space 71. Thereafter, the element analysis unit 102 adds up the word vectors set for the respective words to calculate a feature vector of the whole input document.

(Step S803)
The input/target feature embedding unit 105 acquires the feature vector of the whole input document and word embedded spaces of class features for classification. For example, word embedded spaces constructed for respective classification codes of the ICD codes are used as word embedded spaces of class features.
(Step S804)
The classification output unit 106 executes classification for the input document using the feature vector of the whole input document and the word embedded spaces of the classification classes.
(Step S805)
Thereafter, the classification output unit 106 outputs a classification result for the input document. For example, as a classification result for the input report of death, the code name of the ICD codes is provided, and the classification result is output.

As described above, by the embedded space update processing, because characteristic words for the item "Disease Name 1" designated as the important item are handled with priority as similar words for the word "traffic", it is possible to construct the word embedded space 71 in which the word "traffic" is embedded in proper contexts. In addition, by executing document classification processing using the word embedded space 71 adjusted like this, it is possible to suppress decrease in classification performance due to orthographical variants of the word "traffic" and improve classification performance.

Effects of Embodiment

The following is an explanation of effects of the document classification apparatus 100 according to the present embodiment.

In conventional art, structural information corresponding to logical elements, such as items, cannot be positively handled in construction of word embedding and handled as exceptional processing, in means for analyzing input documents used in an application of automatic document classification or the like for semi-structured documents, such as reports and questionnaires. This structure requires excessive cost due to requirement for check by manpower and the like, and causes decrease in classification performance.

The document classification apparatus 100 according to the present embodiment is capable of acquiring text content for each of logical elements from semi-structured document data including text data stored for respective logical elements, selecting logical elements from the logical elements and generating a plurality of logical element sets each including one or more of the logical elements, analyzing text contents for the respective logical element sets to construct respective word embedded spaces, selecting, from the word embedded spaces, a first word embedded space and a second word embedded space including a common word shared with the first word embedded space, and updating the first word embedded space on the basis of similarity to the common word in the second word embedded space. The document classification apparatus 100 is also capable of outputting a classification result of the document data using the updated first word embedded space and embedding information of a feature quantity of a classification target.

With the structure described above, the document classification apparatus 100 according to the present embodiment is enabled to execute embedding while maintaining specificity of the word appearance distribution in each logical element, when word embedding is constructed from semi-structured document data. Specifically, the document classification apparatus 100 is capable of acquiring a common word common to a plurality of word embedded spaces, and updating embedding information in a word embedded space formed of a plurality of logical elements on the basis of embedding information acquired in another word embedding space. This structure enables update of a word embedded space of a plurality of items on the basis of word appearance distribution in each of items, unlike the case of handing text information for each of cases in a smooth manner without providing distinction between items. This structure enables adjustment of weight of a word appearing over items in a word embedded space, and weighting in consideration of the context being the item is reflected. By executing classification of documents using a word embedded space updated as described above, classification can be executed with positive use of a feature of a word appearing in a specific logical element. This structure improves resolution of documents and improves classification accuracy.

(First Modification)

Figure 9:
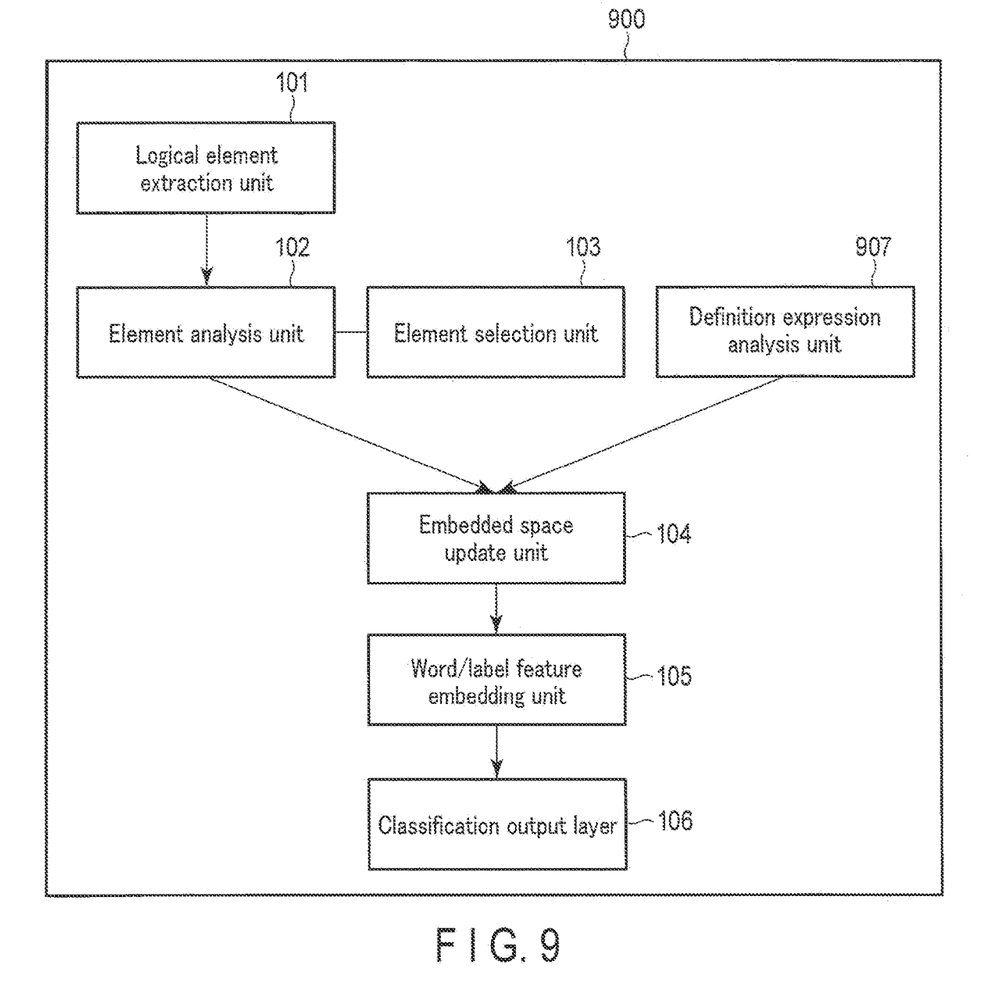
FIG. 9 is a diagram illustrating an example of a configuration of a document classification apparatus according to a modification.

The following is an explanation of a first modification. The present modification is acquired by modifying the structure of the embodiment as follows. An explanation of structures, operations, and effects similar to those of the embodiment will be omitted. Generally, definition sentences are prepared for classification codes of various field, and the definition sentences describe the contents thereof using short sentences and/or terms. A document classification apparatus 900 according to the present modification is different from the embodiment in that a word embedded space is updated using a definition sentence relating to a classification target.

FIG. 9 is a diagram illustrating a configuration of the document classification apparatus 900 according to the present modification. The document classification apparatus 900 further includes a definition expression analysis unit 907.

Figure 10:
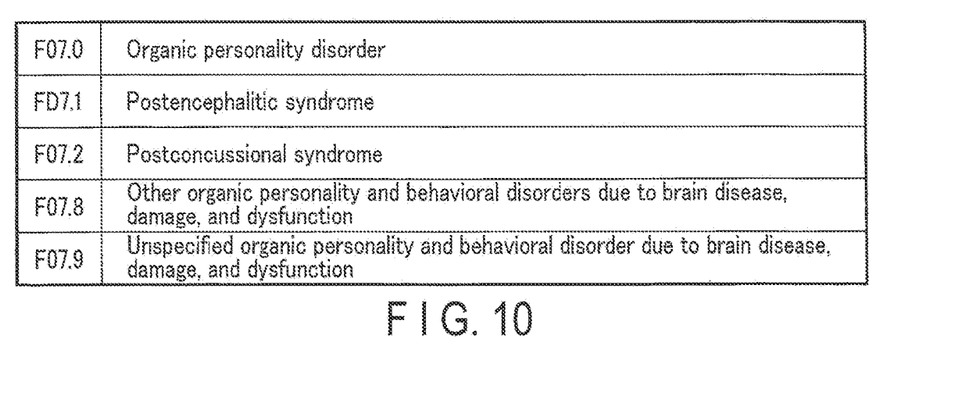
FIG. 10 is a diagram illustrating an example of definition sentences used in a document classification apparatus according to a first modification.

The definition expression analysis unit 907 acquires definition information relating to the classification target. The definition information includes, for example, definition sentences and/or definition expressions defining the contents and/or features of classification classes. For example, the definition expression analysis unit 907 acquires definition sentences as the definition information by analyzing documents prepared separately from input documents for learning and including definition sentences and definition expressions. FIG. 10 is a diagram illustrating an example of definition sentences serving as the definition information. FIG. 10 illustrates ICD codes to be provided in the end in the left line, and definitions of the ICD codes in the right line.

The embedded space update unit 104 acquires the definition sentences acquired with the definition expression analysis unit 907, and updates the first word embedded space by causing the first word embedded space to learn the acquired definition sentences. For example, the embedded space update unit 104 causes the first word embedded space to learn by inputting the definition sentences of the respective codes as illustrated in FIG. 10 to the first word embedded space serving as the update target. In this manner, the word embedded space reflecting the features of the definition sentences is constructed, and this structure improves the classification performance of document classification using the updated word embedded space.

(Second Modification)

In addition, there are cases where definition sentences defining a hierarchical structure of the classification classes. The definition sentences defining the hierarchical structure are, for example, a sentence defining a classification class by citing or referring to another classification class, that is, a sentence providing definition by citing and/or referring to the same layer and/or other layer information. For example, the definition sentence with hierarchical definition includes an exclusive expression, such as "other than" and "other", and supplementary information supplementing another classification class. The exclusive expression may also be referred to as "exceptional expression".

Figure 11:
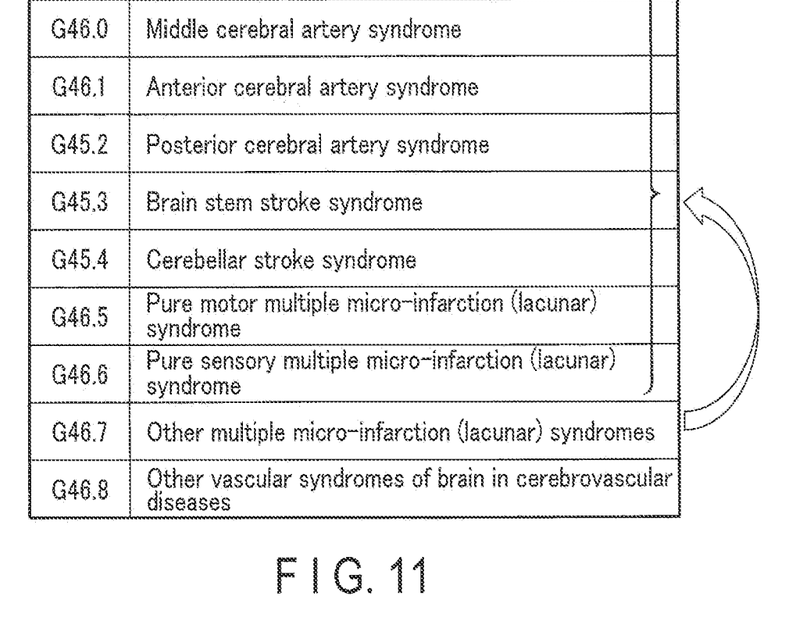
FIG. 11 is a diagram illustrating an example of definition sentences used in a document classification apparatus according to a second modification.
Figure 12:
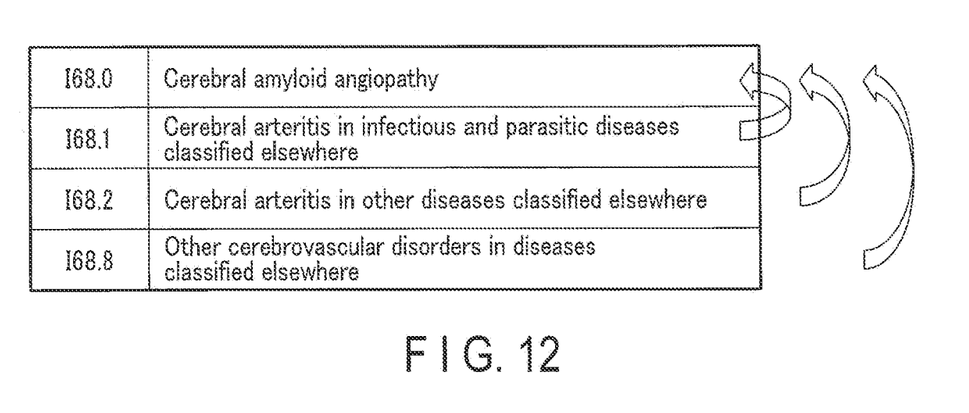
FIG. 12 is a diagram illustrating an example of defining sentences used in the document classification apparatus according to the second modification.

FIG. 11 and FIG. 12 are diagrams illustrating an example of definition sentences with hierarchical definitions. FIG. 11 and FIG. 12 illustrate ICD codes to be provided in the end in the left line, and definitions of the ICD codes in the right line. For example, the definition sentence of the code "G46.7" in FIG. 11 includes the expression "other", and shows that the code "G46.7" is exclusive for the classification classes "G46.0" to "G46.6". In addition, the definition sentences of the codes "168.1", "168.2", and "168.8" include the expression "elsewhere", and show that the codes "168.1", "168.2", and "168.8" are exclusive for the classification class "168.0".

The embedded space update unit 104 extracts the exclusive expression or the supplementary expression citing another classification class from the definition information, and causes the first word embedded space to learn using the sentences including the exclusive expression as negative examples for the cited classification class and using the sentences including the supplementary expression as positive examples for the cited classification class.

In conventional document classification, difficulty exists in execution of learning in consideration of exclusive expressions, such as "other than" and "other". In the present modification, it is possible to update the word embedded space serving as the update target using the definition sentences with hierarchical definitions of the classification target. For example, when the word embedded space is updated using the definition sentences as illustrated in FIG. 11, the definition sentence of "G46.7" is handled as a positive example, and the definition sentences of "G46.0" to "G46.6" are handled as negative examples. In this manner, a word embedded space is constructed in view of hierarchical definitions of the definition sentences, and this structure improves accuracy of document classification using the updated word embedded space. In the same manner, when the word embedded space is updated using the definition sentences as illustrated in FIG. 12, the definition sentence of "168.0" is handled as a positive example, and the definition sentences of "168.1", "168.2", and "168.8" are handled as negative examples. In this manner, a word embedded space is constructed in view of hierarchical definitions of the definition sentences, and this structure improves accuracy of document classification using the updated word embedded space.

(Application Example)

Figure 13:
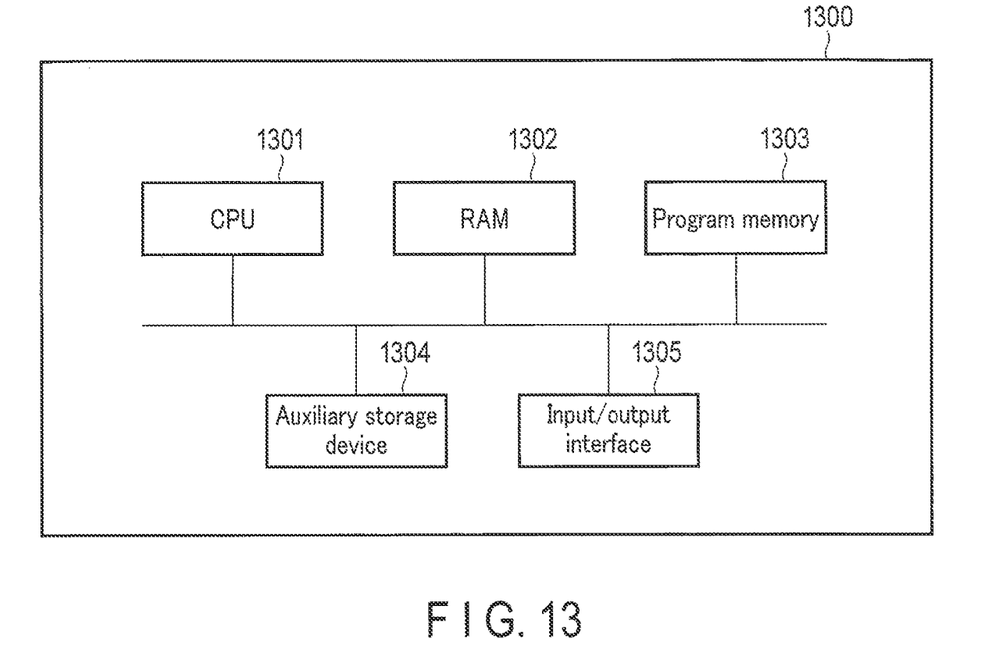
FIG. 13 is a diagram illustrating an example of a configuration of a document classification apparatus according to an application example.

FIG. 13 is a block diagram illustrating a hardware configuration of a document classification apparatus 1300 according to an application example. The application example is a specific example of the embodiment and the modifications, and has a form in which the document classification apparatus 100 or 900 is achieved with a computer.

The document classification apparatus 1300 includes a CPU (Central Processing Unit) 1301, a RAM (Random Access Memory) 1302, a program memory 1303, an auxiliary storage device 1304, and an input/output interface 1305, as hardware. The CPU 1301 communicates with the RAM 1302, the program memory 1303, the auxiliary storage device 1304, and the input/output interface 1305 via a bus. Specifically, the document classification apparatus 1300 according to the present embodiment is achieved with a computer of such a hardware configuration.

The CPU 1301 is an example of a general-purpose processor. The RAM 1302 is used with the CPU 1301 as a working memory. The RAM 1302 includes a volatile memory, such as a SDRAM (Synchronous Dynamic Random Access Memory). The program memory 1303 stores a data analysis program to achieve the units according to each embodiment. The data analysis program may be, for example, a program to cause a computer to achieve the functions of the logical element extraction unit 101, the element analysis unit 102, the element selection unit 103, the embedded space update unit 104, the input/target feature embedding unit 105, the classification output unit 106, and the definition expression analysis unit 907. For example, a ROM (Read-Only Memory), part of the auxiliary storage device 1304, or a combination thereof is used as the program memory 1303. The auxiliary storage device 1304 stores data in a non-transitory manner. The auxiliary storage device 1304 includes a nonvolatile memory, such as a HDD (hard disk drive) and a SSD (solid state drive).

The input/output interface 1305 is an interface to connect to other devices. The input/output interface 1305 is used for connection to, for example, a keyboard, a mouse, a database, and a display.

The data analysis program stored in the program memory 1303 includes a computer-executable command. When the data analysis program (computer-executable command) is executed with the CPU 1301 serving as a processing circuit, the data analysis program causes the CPU 1301 to execute a series of processes explained with respect to the units in FIG. 1 or FIG. 9. For example, the computer-executable command included in the data analysis program causes the CPU 1301 to execute a data analysis method, when it is executed with the CPU 1301. The data analysis method may include steps corresponding to the respective functions of the logical element extraction unit 101, the element analysis unit 102, the element selection unit 103, the embedded space update unit 104, the input/target feature embedding unit 105, the classification output unit 106, and the definition expression analysis unit 907. In addition, the data analysis method may properly include the steps illustrated in FIG. 2 or FIG. 8.

The data analysis program may be provided to the document classification apparatus 1300 being a computer, in a state of being stored in a computer-readable storage medium. In this case, for example, the document classification apparatus 1300 further includes a drive (not illustrated) reading data from a storage medium, and acquires the data analysis program from the storage medium. Examples of the storage medium include a magnetic disk, an optical disk (such as a CD-ROM, a CD-R, a DVD-ROM, and a DVD-R), a magneto-optic disk (such as a MO), and a semiconductor memory, and they can be properly used. The storage medium may be referred to as "non-transitory computer-readable storage medium". The data analysis program may be stored in a server on a communication network, and the document classification apparatus 1300 may download the data analysis program from the server using the input/output interface 1305.

The processing circuit executing the data analysis program is not limited to general-purpose hardware, such as the CPU 1301, but may be a dedicated hardware processor, such as an ASIC (Application Specific Integrated Circuit). The term "processing circuit (processing unit)" include at least one hardware processor, at least one dedicated hardware processor, or a combination of at least one general-purpose hardware processor and at least one dedicated hardware processor. In the example illustrated in FIG. 13, the CPU 1301, the RAM 1302, and the program memory 1303 correspond to the processing circuit.

Thus, the embodiment described above can provide a document classification apparatus, a method, and a program executing document classification executing document classification for semi-structured document data in consideration of features of logical elements.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A document classification apparatus comprising:
    a storage storing a machine learning model used for document classification of input document data; and
    a hardware processing circuit operatively coupled to the storage, the processing circuit being configured to execute processes comprising:
        acquiring text content for each of logical elements included in input semi-structured document data, the semi-structured document data including the logical elements and text data stored in association with each of the logical elements;
        selecting logical elements from among the logical elements, and generating a plurality of mutually different sets of logical elements, each of the sets of logical elements including at least one of the logical elements;
        analyzing text contents for respective sets of logical elements, and constructing respective word embedded spaces based on a result of the analyzing, each of the word embedded spaces being constructed based on a corresponding one of the logical elements and including multidimensional vector information set for each unit thereof, and each of the word embedded spaces using at least one of a word, a compound word, and a subword as the unit thereof;
        selecting, from among the word embedded spaces, a first word embedded space and a second word embedded space including a common word shared with the first word embedded space, and updating the first word embedded space based on a similarity to the common word in the second word embedded space to obtain an updated first word embedded space;
        outputting data indicating a classification result of the semi-structured document data having been classified using (i) the updated first word embedded space and (ii) embedding information indicating a feature quantity of a classification target; and
        classifying a whole of the semi-structured document data using the updated first word embedded space, the updated first word embedded space being updated by performing training of the first word embedded space using the machine learning model.

2. The document classification apparatus according to claim 1, wherein the processes comprise updating the first word embedded space by causing the first word embedded space to learn a sentence including the common word.

3. The document classification apparatus according to claim 2, wherein the processes comprise extracting a similar word for the common word from the second word embedded space, and causing the first word embedded space to learn using a sentence including the similar word as a positive example and a sentence including no similar word as a negative example.

4. The document classification apparatus according to claim 2, wherein the processes further comprise extracting a similar word for the common word from the second word embedded space, and causing the first word embedded space to learn by adjusting a weighting of the first word embedded space in accordance with an appearance rate of the similar word.

5. The document classification apparatus according to claim 2, wherein the processes comprise acquiring definition information relating to the classification target, and updating the first word embedded space by causing the first word embedded space to learn the definition information in addition to the sentence.

6. The document classification apparatus according to claim 5, wherein the processes comprise extracting an exclusive expression or supplementary information citing another classification class, and causing the first word embedded space to learn using a sentence including the exclusive expression as a negative example for a cited classification class and a sentence including the supplementary information as a positive example for the another classification class in sentences included in the definition information.

7. The document classification apparatus according to claim 1, wherein the classifying comprises:
- executing convolution processing for each word forming the word embedded space using a plurality of filters to generate a new feature quantity;
- executing pooling processing for the new feature quantity generated with each of the plurality of filters, and outputting a multidimensional feature quantity; and
- outputting a result acquired by multiplying the output of the pooling processing by a softmax function as the classification result.

8. The document classification apparatus according to claim 1, wherein the machine learning model is one of a convolutional neural network (CNN) and a recurrent neural network (RNN).

9. A method executed under control of a hardware processing circuit operatively coupled to a storage storing a machine learning model used for document classification of input document data, the method comprising:
- acquiring text content for each of logical elements included in input semi-structured document data, the semi-structured document data including the logical elements and text data stored in association with each of the logical elements;
- selecting logical elements from among the logical elements, and generating a plurality of mutually different sets of logical elements, each of the sets of logical elements including at least one of the logical elements;
- analyzing text contents for respective sets of logical elements, and constructing respective word embedded spaces based on a result of the analyzing, each of the word embedded spaces being constructed based on a corresponding one of the logical elements and including multidimensional vector information set for each unit thereof, and each of the word embedded spaces using at least one of a word, a compound word, and a subword as the unit thereof;
- selecting, from among the word embedded spaces, a first word embedded space and a second word embedded space including a common word shared with the first word embedded space, and updating the first word embedded space based on a similarity to the common word in the second word embedded space to obtain an updated first word embedded space;
- outputting data indicating a classification result of the semi-structured document data having been classified using (i) the updated first word embedded space and (ii) embedding information indicating a feature quantity of a classification target; and
- classifying a whole of the semi-structured document data using the updated first word embedded space, the updated first word embedded space being updated by performing training of the first word embedded space using the machine learning model.

10. A non-transitory computer-readable storage medium storing a program thereon, the program being executable by a hardware processor operatively coupled to a storage storing a machine learning model used for document classification of input document data to control the hardware processor to execute processes comprising:
- acquiring text content for each of logical elements included in input semi-structured document data, the semi-structured document data including the logical elements and text data stored in association with each of the logical elements;
- selecting logical elements from among the logical elements, and generating a plurality of mutually different sets of logical elements, each of the sets of logical elements including at least one of the logical elements;
- analyzing text contents for respective sets of logical elements, and constructing respective word embedded spaces based on a result of the analyzing, each of the word embedded spaces being constructed based on a corresponding one of the logical elements and including multidimensional vector information set for each unit thereof, and each of the word embedded spaces using at least one of a word, a compound word, and a subword as the unit thereof;
- selecting, from among the word embedded spaces, a first word embedded space and a second word embedded space including a common word shared with the first word embedded space, and updating the first word embedded space based on a similarity to the common word in the second word embedded space to obtain an updated first word embedded space;
- outputting data indicating a classification result of the semi-structured document data having been classified using (i) the updated first word embedded space and (ii) embedding information indicating a feature quantity of a classification target; and
- classifying a whole of the semi-structured document data using the updated first word embedded space, the updated first word embedded space being updated by performing training of the first word embedded space using the machine learning model.

* * * * *